(12) United States Patent
Setter et al.

(10) Patent No.: US 11,561,709 B1
(45) Date of Patent: Jan. 24, 2023

(54) DYNAMIC RECOVERY-OBJECTIVE-BASED CONFIGURATION OF BACKUP VOLUMES

(71) Applicant: Amazon Technologies, Inc., Seattle, WA (US)

(72) Inventors: Ophir Setter, Ramat-Gan (IL); Yoram Cohen, Givataim (IL); Sigal Weiner, Holon (IL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/444,455

(22) Filed: Aug. 4, 2021

(51) Int. Cl.
*G06F 3/06* (2006.01)

(52) U.S. Cl.
CPC .......... *G06F 3/0631* (2013.01); *G06F 3/0604* (2013.01); *G06F 3/065* (2013.01); *G06F 3/067* (2013.01)

(58) Field of Classification Search
CPC ...... G06F 3/0631; G06F 3/0604; G06F 3/065; G06F 3/067
USPC .......................................................... 711/162
See application file for complete search history.

(56) References Cited

U.S. PATENT DOCUMENTS

| | | | | |
|---|---|---|---|---|
| 8,966,382 B1* | 2/2015 | Yehuda | ................. | G06F 3/0484 715/762 |
| 2015/0089132 A1* | 3/2015 | Madhusudana | ....... | G06F 3/0685 711/114 |
| 2016/0127200 A1* | 5/2016 | Dippenaar | .......... | H04L 67/1097 709/224 |
| 2018/0027174 A1* | 1/2018 | Sengoku | ............ | H04N 5/23245 348/207.11 |
| 2021/0103547 A1* | 4/2021 | Ahmed | ............... | G06F 13/4295 |

\* cited by examiner

*Primary Examiner* — Than Nguyen
(74) *Attorney, Agent, or Firm* — Knobbe, Martens, Olson & Bear, LLP

(57) ABSTRACT

Dynamic configuration of backups of production volumes based on desired recovery objectives is provided. A system may obtain a recovery point objective ("RPO") for a particular production volume. The system may initially back up data, written to the production volume, to a storage volume with certain performance parameters. However, if the write operations to the production volume occur at a high enough rate and/or affect a large enough amount of data, there may be a lag in writing that data to the backup volume. The system may monitor the lag with respect to the specified RPO for backup of the production volume. If the lag approaches the RPO, then the system may dynamically change the configuration of the backup volume to better satisfy the RPO.

20 Claims, 9 Drawing Sheets

DYNAMIC RECOVERY-OBJECTIVE-BASED CONFIGURATION OF BACKUP VOLUMES

BACKGROUND

Cloud computing, in general, is an approach to providing access to information technology resources through services, such as Web services, where the hardware and/or software used to support those services is dynamically scalable to meet the needs of the services at any given time. In cloud computing, elasticity refers to network-delivered computing resources that can be scaled up and down by the cloud service provider to adapt to changing requirements of users. The elasticity of these resources can be in terms of processing power, storage, bandwidth, etc. Elastic computing resources may be delivered automatically and on-demand, dynamically adapting to the changes in resource requirement on or within a given user's system. For example, a user can use a cloud service to host a large online streaming service, setup with elastic resources so that the number of webservers streaming content to users scale up to meet bandwidth requirements during peak viewing hours, and then scale back down when system usage is lighter.

A user typically will rent, lease, or otherwise pay for access to resources through the cloud, and thus does not have to purchase and maintain the hardware and/or software to provide access to these resources. This provides a number of benefits, including allowing users to quickly reconfigure their available computing resources in response to the changing demands of their enterprise, and enabling the cloud service provider to automatically scale provided computing service resources based on usage, traffic, or other operational needs. This dynamic nature of network-based computing services, in contrast to a relatively static infrastructure of on-premises computing environments, requires a system architecture that can reliably re-allocate its hardware according to the changing needs of its user base.

When computing resources are used by or at the direction of a user, data may be loaded, generated, modified, or the like. To ensure that data remains available in the event of a loss of computing resources (e.g., computer failure, storage failure, etc.), the data may be backed up to a separate storage volume where it may later be accessed.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
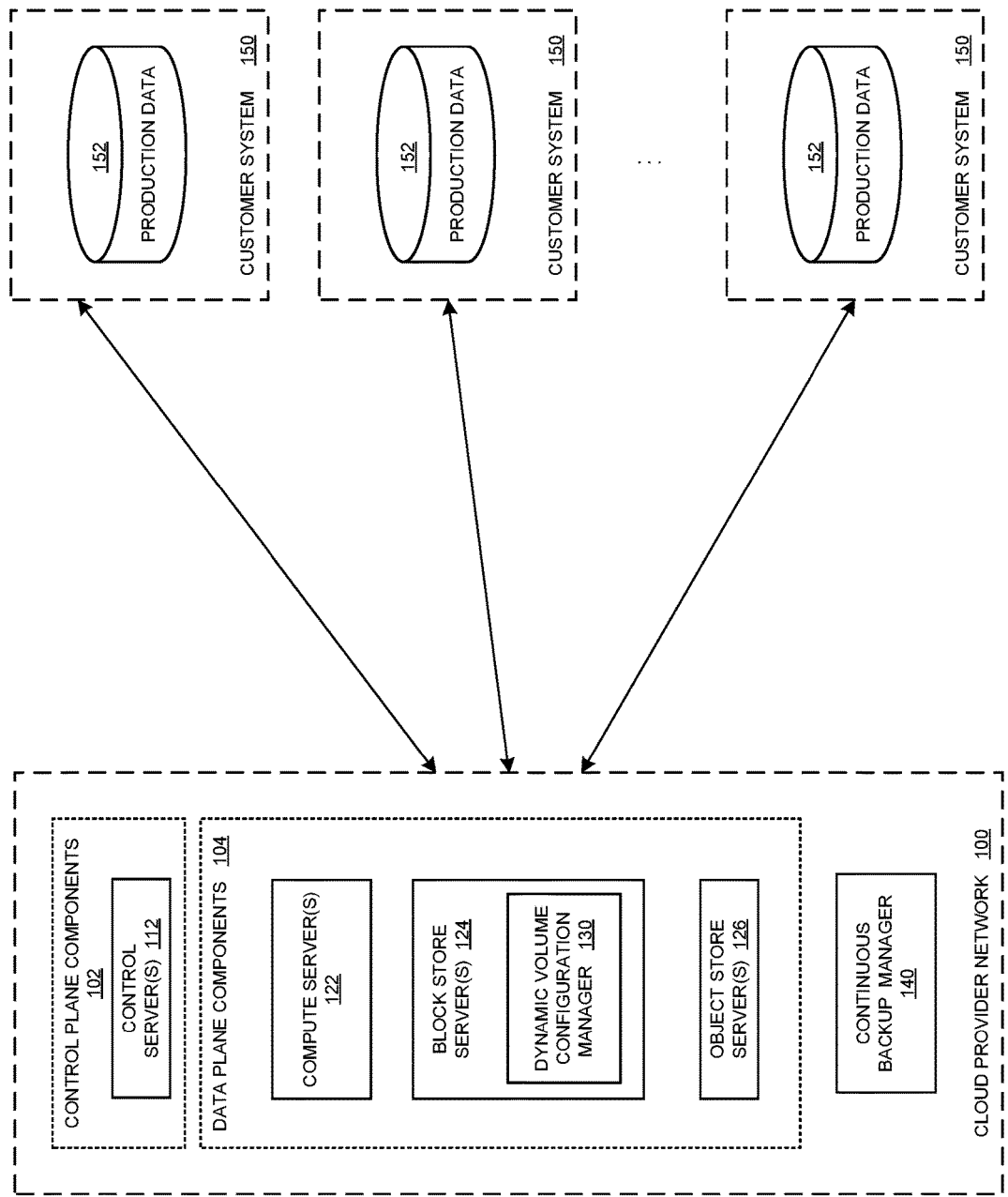
FIG. 1 is a block diagram of an example cloud provider network with dynamic volume configuration according to some embodiments.

Generally described, the present disclosure relates to dynamic configuration of storage volumes. Data may be stored to a storage volume or device for a variety of reasons, such as to back up a separate storage volume or device. For example, data that is stored to one block storage volume (e.g., a production volume) may be backed up to a second block storage volume for disaster recovery purposes. Various storage objectives and/or metrics may be evaluated to determine whether to dynamically change to a different storage volume with different characteristics. For example, a recovery point objective ("RPO") for the amount of data loss acceptable when recovering from a failure, defined in terms of a period of time (e.g., 15 minutes of data, 1 hour of data, 4 hours of data, 1 day of data, etc.), may be used to dynamically change the configuration of a storage volume. As another example, a burst metric regarding a permitted amount of data input/output ("IO") operations may be used to dynamically change the configuration of a storage volume.

Some storage volumes provide a high degree of throughput in units of storage per unit of time (e.g., megabytes per second) and/or input/output operations per second ("IOPS"). Such storage volumes may be desirable when used to back up data with a short RPO (e.g., only 15 minutes of data loss is acceptable). However, such storage volumes may be expensive to acquire, maintain, and utilize, and may therefore be undesirable for certain uses or in certain scenarios, including implementations that do not regularly require the high degree of throughput and/or IOPS (e.g., implementations with short or irregular bursts of activity). Other storage volumes are less expensive to acquire, maintain, and utilize. Such storage volumes may be desirable when used to back up data with a long RPO (e.g., 4 hours of data loss is acceptable). However, such storage volumes may provide a lower degree of throughput and/or a lower number of IOPS, and may therefore be undesirable for certain uses or in certain scenarios, including implementations that regularly exceed the available throughput and/or IOPS, and implementations that approach the maximum throughput and/or IOPS for extended periods of time.

Some aspects of the present disclosure address the issues noted above, among others, by dynamically configuring backup storage volumes of production volumes based on desired recovery objectives. In some embodiments, a continuous backup management system may obtain an RPO for a particular production volume or set of production volumes. The continuous backup management system may initially back up data, written to the production volume, to a storage volume with certain performance parameters. For example, the initial backup volume may provide a relatively low degree of throughput in comparison with other available backup volumes, but the initial volume may also be lower in cost than the other available backup volumes. The continuous backup management system may monitor or be informed of I/O operations made to the production volume, and may make corresponding I/O operations to the backup volume. However, the rate at which the backup I/O operations can be performed is limited by the performance parameters of the initial backup volume. For example, if write operations to the production volume occur at a high enough rate and/or affect a large enough amount of data, there may be a lag in writing that data to the backup volume. The continuous backup management system may monitor the lag with respect to the specified RPO for backup of the production volume. If the lag approaches the RPO (e.g., if the RPO is 1 hour and the lag in writing data to the backup volume approaches 1 hour), then there is a risk of data loss approaching the maximum data loss permitted under the RPO. In such a scenario, the continuous backup management system may dynamically change the configuration of the backup volume to better satisfy the RPO. In some embodiments, changing the configuration of the backup volume may involve changing from using one volume type to using a different volume type (e.g., different physical volumes having different types, such as solid state drives, hard disk drives), or changing various parameters of the storage volume.

In one example of changing the configuration of the backup volumes used, the continuous backup management system can switch from performing backup writing operations on a backup volume of a first volume type, such as an initial lower-throughput backup storage volume type (also referred to as the lower-throughput volume, lower-tier volume, or "LTV") to performing backup write operations on a backup volume of a second volume type, such as a higher-throughput backup storage volume type (also referred to as a to as a higher-throughput volume, higher-tier volume, or "HTV").

Volume types may differ in performance characteristics and price, so that storage can be tailored to the needs of individual applications. The volume types may in some embodiments fall into these categories: solid state drives ("SSD") optimized for transactional workloads involving frequent read/write operations with small I/O size, where the dominant performance attribute is IOPS; and hard disk drives ("HDD") optimized for large streaming workloads where the dominant performance attribute is throughput. Moreover, SSD volume types may fall into different subtypes, including: general purpose SSDs that provide a balance of price and performance and are managed using a token bucket algorithm as described in greater detail below; and provisioned IOPS SSDs that provide a consistent (relatively high) level of IOPS rather than being managed using token bucket algorithms. Additionally, HDD volume types may fall into different subtypes, including: throughput-optimized HDDs with performance defined in terms of throughput rather than IOPS, and that may be managed using a token bucket algorithm; and cold HDDs with performance also defined in terms of throughput rather than IOPS, but providing a lower throughput at a lower price point than throughput-optimized HDDs.

In another example of changing the configuration of a backup volume, the same physical storage volume (or other computing resource) may continue to be used, but it may permit dynamic configuration of various parameters, such as changing from a lower throughput to a higher throughput (e.g., by changing aspects of the network used to communicate with the backup volume). Alternatively, the backup volume may remain the same logical storage volume (e.g., may appear to be the same storage volume to users of the volume, such as by having the same identifier), but the underlying physical storage volume or other computing resources on which the logical volume is implemented may be dynamically changed to provide different degrees of performance.

The example volume configurations and methods for changing the configurations described above and in greater detail below are illustrative only, and are not intended to be limiting, required, or exhaustive. In addition, the various volume configurations and methods for changing the configurations may be used interchangeably in some embodiments. For example, where a change in a storage volume is described as being from one storage volume tier to another storage volume tier (e.g., from an LTV to an HTV), the change may be a dynamic configuration change to a storage volume, which may be implemented by changing to different physical storage volumes or by retaining the same physical storage volumes and changing related properties to provide different degrees of performance.

Additional aspects of the present disclosure relate to dynamically configuring block storage volumes based on storage metrics. In some embodiments, a storage volume may throttle various performance parameters, such as throughput or IOPS. For example, a storage volume may manage IOPS using a token bucket algorithm in which a user of the volume is provided tokens at a constant rate, and the tokens may accumulate in a bucket during idle periods. Each I/O operation that is performed on the storage volume may reduce the number of accumulated tokens in the bucket. Thus, the baseline IOPS corresponds to the rate at which tokens are provided to the user (e.g., if x tokens per second are added to the bucket, then x IOPS is the baseline for the volume). The user may be permitted to perform more IOPS for a period of time if there are enough tokens available in the bucket. This scenario may be referred to as a "burst." Hardware or policy considerations may impose a "burst limit" that defines the maximum rate at which I/O operations may be performed, even if there are enough tokens available to perform more I/O operations for a period of time.

A "burst balance" metric may provide a measurement of tokens available in the bucket (e.g., a percentage between 0% and 100%, where 100% corresponds to the maximum number of tokens permitted in the bucket). The burst balance may be used to dynamically determine when to change configuration of a storage volume. In some embodiments, if the rate at which the burst balance decreases approaches the burst limit for a period of time, then a dynamic configuration change to the storage volume may be triggered. For example, if data is being written to or read from an LTV, subsequent I/O operations may be made to an HTV. In some embodiments, if the burst balance falls below a threshold, a dynamic configuration change to the storage volume may be triggered.

Further aspects of the present disclosure relate to dynamically configuring use of a storage volume to change from using an HTV to using an LTV. In some embodiments, a continuous backup management system may change from using an HTV to an LTV after a period of time has passed (e.g., a period of time equal to the RPO) and/or if the lag between I/O operations to the production volume and I/O operations to the backup volume satisfies a criterion (e.g., falls below a threshold and/or remains below a threshold for a period of time). In some embodiments, use of storage volumes may be reconfigured if a burst balance metric satisfies a criterion. For example, if the burst balance meets or exceeds a threshold and/or remains at or above the threshold for a period of time, a continuous backup management system may change from using an HTV to an LTV. When changing from using an HTV to an LTV, new I/O operations may be performed on the LTV and, in some embodiments, the data previously written to the HTV is copied in parallel or asynchronously to the LTV.

Various aspects of the disclosure will now be described with regard to certain examples and embodiments, which are intended to illustrate but not limit the disclosure. Although aspects of some embodiments described in the disclosure will focus, for the purpose of illustration, on particular examples of storage volumes, performance parameters, recovery objectives, and storage metrics, the examples are illustrative only and are not intended to be limiting. In some embodiments, the techniques described herein may be applied to additional or alternative storage volumes, performance parameters, recovery objectives, storage metrics, and the like. For example, although the description that follows focuses on examples in which data write operations are performed and/or monitored to make storage volume configuration decisions, the same methods may be applied to all I/O operations, including data read operations. Any architecture, metric, parameter, or volume type used in any embodiment described herein may be used in any combination with other architectures, metrics, parameters, and volume types, without limitation.

Overview of Example Computing Environment

With reference to an illustrative embodiment, FIG. 1 shows an example computing environment in which features of the present disclosure may be implemented. As shown, the computing environment includes a cloud provider network substrate 100 (also referred to herein as a "cloud provider network," "provider network," "cloud provider system", or simply as a "cloud" for convenience) and any number of customer systems 150 (also referred to herein simply as "customers" for convenience) that store data at the cloud provider network 100. The cloud provider network 100 and the customers 150 may communicate with each over via an intermediate network (not shown), such as the Internet.

The cloud provider network 100 is a pool of network-accessible computing resources (such as compute, storage, and networking resources, applications, and services), which may be virtualized or bare-metal. The cloud provider network 100 can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

Cloud provider networks often provide access to computing resources via a defined set of regions, availability zones, and/or other defined physical locations where a cloud provider network clusters data centers. In many cases, each region represents a geographic area (e.g., a U.S. East region, a U.S. West region, an Asia Pacific region, and the like) that is physically separate from other regions, where each region can include two or more availability zones connected to one another via a private high-speed network, e.g., a fiber communication connection. A physical or infrastructure availability zone (also known as an availability domain, or simply a "zone") refers to an isolated failure domain including one or more data center facilities with separate power, separate networking, and separate cooling from those in another availability zone. Preferably, physical availability zones within a region are positioned far enough away from one other that the same natural disaster should not take more than one availability zone offline at the same time, but close enough together to meet a latency requirement for intra-region communications.

Furthermore, regions of a cloud provider network are connected to a global "backbone" network which includes private networking infrastructure (e.g., fiber connections controlled by the cloud provider) connecting each region to at least one other region. This infrastructure design enables users of a cloud provider network to design their applications to run in multiple physical availability zones and/or multiple regions to achieve greater fault-tolerance and availability. For example, because the various regions and physical availability zones of a cloud provider network are connected to each other with fast, low-latency networking, users can architect applications that automatically failover between regions and physical availability zones with minimal or no interruption to users of the applications should an outage or impairment occur in any particular region.

The cloud provider network 100 shown in FIG. 1 can provide on-demand, scalable computing platforms to users through a network, for example allowing users to have at their disposal scalable "virtual computing devices" via their use of the compute servers 122 (which provide compute instances via the usage of one or both of CPUs and GPUs, optionally with local storage) and block store servers 124 (which provide virtualized persistent block storage for designated compute instances). These virtual computing devices have attributes of a personal computing device including hardware (various types of processors, local memory, random access memory ("RAM"), hard-disk and/or solid-state drive ("SSD") storage), a choice of operating systems, networking capabilities, and pre-loaded application software. Each virtual computing device may also virtualize its console input and output (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. An application programming interface ("API") refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. Users can choose to deploy their virtual computing systems to provide network-based services for their own use and/or for use by their customers or clients.

A cloud provider network 100 can be formed as a number of regions, where a region is a separate geographical area in which the cloud provider clusters data centers. Each region can include two or more availability zones connected to one another via a private high speed network, for example a fiber communication connection. An availability zone refers to an isolated failure domain including one or more data center facilities with separate power, separate networking, and separate cooling from those in another availability zone. Preferably, availability zones within a region are positioned far enough away from one another that the same natural disaster should not take more than one availability zone offline at the same time. Customers can connect to availability zones of the cloud provider network via a publicly accessible network (e.g., the Internet, a cellular communication network). Transit Centers ("TC") are the primary backbone locations linking customers to the cloud provider network, and may be co-located at other network provider facilities (e.g., Internet service providers, telecommunications providers). Each region can operate two TCs for redundancy.

The cloud provider network 100 can include a physical network (e.g., sheet metal boxes, cables, rack hardware) referred to as the substrate. The substrate can be considered as a network fabric containing the physical hardware that runs the services of the provider network, and can include networking devices such as routers, switches, network address translators ("NATs"), and so on, as well as the physical connections among the devices. The substrate may be isolated from the rest of the cloud provider network 100, for example it may not be possible to route from a substrate network address to an address in a production network that runs services of the cloud provider, or to a customer network that hosts customer resources.

The cloud provider network 100 can also include an overlay network of virtualized computing resources that run on the substrate. In at least some embodiments, hypervisors or other devices or processes on the network substrate may use encapsulation protocol technology to encapsulate and route network packets (e.g., client IP packets) over the network substrate between client resource instances on different hosts within the provider network. The encapsulation protocol technology may be used on the network substrate to route encapsulated packets (also referred to as network substrate packets) between endpoints on the network substrate via overlay network paths or routes. The encapsulation protocol technology may be viewed as providing a virtual network topology overlaid on the network substrate. As such, network packets can be routed along a substrate network according to constructs in the overlay network (e.g., VPCs, security groups). A mapping service can coordinate the routing of these network packets. The mapping service can be a regional distributed look up service that maps the combination of overlay IP and network identifier to substrate IP so that the distributed substrate computing devices can look up where to send packets.

To illustrate, each physical host (e.g., a compute server 122, a block store server 124, an object store server 126, a control server 112) can have an IP address in the substrate network. Hardware virtualization technology can enable multiple operating systems to run concurrently on a host computer, for example as virtual machines ("VMs") on a compute server. A hypervisor, or virtual machine monitor ("VMM"), on a host allocates the host's hardware resources amongst various VMs on the host and monitors the execution of VMs. Each VM may be provided with one or more IP addresses in the overlay network, and the VMM on a host may be aware of the IP addresses of the VMs on the host. The VMMs (and/or other devices or processes on the network substrate) may use encapsulation protocol technology to encapsulate and route network packets (e.g., client IP packets) over the network substrate between virtualized resources on different hosts within the cloud provider network 100. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (public IP addresses) to substrate IP addresses (private IP addresses), which can be accessed by various processes on the cloud provider network for routing packets between endpoints.

The traffic and operations of the provider network substrate may broadly be subdivided into two categories in various embodiments: control plane traffic carried over a logical control plane and data plane operations carried over a logical data plane. While the data plane represents the movement of user data through the distributed computing system, the control plane represents the movement of control signals through the distributed computing system. The control plane generally includes one or more control plane components 102 distributed across and implemented by one or more control servers 112. Control plane traffic generally includes administrative operations, such as establishing isolated virtual networks for various customers, monitoring resource usage and health, identifying a particular host or server at which a requested compute instance is to be launched, provisioning additional hardware as needed, and so on. The data plane generally includes one or more data plane components 104 distributed across and implemented by one or more data plane servers. The data plane includes customer resources that are implemented on the cloud provider network 100 (e.g., computing instances, containers, block storage volumes, databases, file storage, etc., as described in greater detail below). Data plane traffic generally includes non-administrative operations such as transferring data to and from the customer resources.

The control plane components 102 are typically implemented on a separate set of servers from the data plane components 104, and control plane traffic and data plane traffic may be sent over separate/distinct networks. In some embodiments, control plane traffic and data plane traffic can be supported by different protocols. In some embodiments, messages (e.g., packets) sent over the provider network include a flag to indicate whether the traffic is control plane traffic or data plane traffic. In some embodiments, the payload of traffic may be inspected to determine its type (e.g., whether control or data plane). Other techniques for distinguishing traffic types are possible.

As illustrated, the data plane components 104 can include one or more compute servers 122, which may be bare metal (e.g., single tenant) or may be virtualized by a hypervisor to run multiple VMs (sometimes referred to as "instances") for one or more customers. These compute servers 122 can support a virtualized computing service of the cloud provider network 100. The cloud provider network 100 may offer virtual compute instances with varying computational and/or memory resources. In one embodiment, each of the virtual compute instances may correspond to one of several instance types. An instance type may be characterized by its hardware type, computational resources (e.g., number, type, and configuration of central processing units ("CPUs") or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

The data plane can also include one or more block store servers 124, which can include persistent storage for storing volumes of customer data as well as software for managing these volumes. These block store servers can support a managed block storage service of the cloud provider network 100. The block store servers 124 include one or more servers on which data is stored as blocks. A block is a sequence of bytes or bits, usually containing some whole number of records, having a maximum length of the block size. Blocked data is normally stored in a data buffer and read or written a whole block at a time. In general, a volume can correspond to a logical collection of data, such as a set of data maintained on behalf of a user. User volumes, which can be treated as an individual hard drive ranging for example from 1 GB to 1 terabyte TB (or more) in size, are made of one or more blocks stored on the block store servers. Although treated as an individual hard drive, it will be appreciated that a volume may be stored as one or more virtualized devices implemented on one or more underlying physical host devices. Volumes may be partitioned a small number of times (e.g., up to 16) with each partition hosted by a different host. The data of the volume may be replicated between multiple devices within the provider network, in order to provide multiple replicas of the volume (where such replicas may collectively represent the volume on the computing system). Replicas of a volume in a distributed computing system can beneficially provide for automatic failover and recovery, for example by allowing the user to access either a primary replica of a volume or a secondary replica of the volume that is synchronized to the primary replica at a block level, such that a failure of either the primary or secondary replica does not inhibit access to the information of the volume. The role of the primary replica can be to facilitate reads and writes (sometimes referred to as "input output operations," or simply "I/O operations") at the volume, and to propagate any writes to the secondary (preferably synchronously in the I/O path, although asynchronous replication can also be used). The secondary replica can be updated synchronously with the primary replica and provide for seamless transition during failover operations, whereby the secondary replica assumes the role of the primary replica, and either the former primary is designated as the secondary or a new replacement secondary replica is provisioned. A compute instance can virtualize its I/O to a volume by way of a client. The client represents instructions that enable a compute instance to connect to, and perform I/O operations at, a remote data volume (e.g., a data volume stored on a physically separate computing device accessed over a network). The client may be implemented on an offload card of a server that includes the processing units (e.g., CPUs or GPUs) of the compute instance.

The data plane can also include one or more object store servers 126, which represent another type of storage within the cloud provider network 100. The object storage servers 126 include one or more servers on which data is stored as objects within resources referred to as buckets, and can be used to support a managed object storage service of the cloud provider network 100. Each object typically includes the data being stored, a variable amount of metadata that enables various capabilities for the object storage servers with respect to analyzing a stored object, and a globally unique identifier or key that can be used to retrieve the object. Each bucket is associated with a given user account. Customers can store as many objects as desired within their buckets, can write, read, and delete objects in their buckets, and can control access to their buckets and the objects contained therein. Further, in embodiments having a number of different object storage servers distributed across different ones of the regions described above, users can choose the region (or regions) where a bucket is stored, for example to optimize for latency. Customers may use buckets to store objects of a variety of types, including machine images that can be used to launch VMs, and snapshots that can be used to restore volumes.

In some embodiments, a snapshot is a point-in-time block-level backup of a volume, stored as a copy of data on the volume on one or more of the object storage servers 126 (e.g., as a single object or a collection of objects). However, unlike other data stored on the object storage servers 126, snapshots may not be directly accessible within object storage buckets, and instead are accessible through the API of the block store servers 124. In one example, snapshots are implemented as incremental records of data within a volume. Illustratively, when the first snapshot of a volume is taken, all blocks of the volume that contain valid data are copied as one or more objects to the object storage servers 126, and then a snapshot definition or "manifest" file is written to the object storage servers 126 that includes a record of the one or more objects, as well as the blocks of the volume to which each of the one or more objects correspond. Due to the use of incremental snapshots, when the subsequent snapshots are taken of the same volume, only the blocks that have changed since the first snapshot need to be copied to the object storage servers 126, and the manifest can be updated to point to the latest versions of each data block (or a second manifest can be created, enabling the initial manifest to remain as a record of a prior version of the volume). An initial snapshot can be used to reconstruct the volume at the time of the initial snapshot, or snapshots from subsequent time points can be combined together or with the initial snapshot to reconstruct the entire volume at any individual subsequent point in time. In this way snapshots can serve as both incremental backups and a full backup of a given volume.

When creating a snapshot, any data written to the volume up to the time the snapshot is started can be included in the snapshot, and users can continue to perform I/O operations to their volumes during snapshot creation without affecting the snapshot. Users can create a new volume from a snapshot, for example to create duplicates of their volumes or to restore data. The new volume will contain all the data stored in the snapshot and thus will be a duplicate of the original volume at the time the snapshot was started. In this manner, snapshots can also be used to transfer a volume's data from one availability zone to another. Similarly, snapshots can be taken of computing resource instances to create a "machine image" of that instance stored in the object storage servers 126, and new copies of the instance can be launched from the machine image.

Users can instruct the cloud provider network 100 to create snapshots of their volumes on the block store servers 124 and store the snapshots on the object store servers 126. A snapshot can then be used to create a new volume with information matching the volume captured in the snapshot, for example providing the benefit of feeding the volume data to the new copy without impacting I/O operations at other replicas of the volume. Further, due to the greater redundancy of the object store servers 126 provided in some embodiments, such snapshots may provide a more resilient backup copy of a volume than additional copies stored on the block store servers 124. Another benefit of using a snapshot to create a new volume copy is that it may provide the ability to replicate the volume across availability zones, while the block store servers 124 may only support replication within a given availability zone.

Some customers may desire to use the resources and services of the cloud provider network 100, but for various reasons (e.g., latency in communications with customer devices, legal compliance, security, or other reasons) prefer for these resources and services to be provisioned within their own network, for example on premises of the customer. A piece of the cloud provider network—referred to herein as a "provider substrate extension" or PSE— may be provisioned within the customer's network. A customer may access their PSE via the cloud provider network 100 or their own network, and may use the same APIs to create and manage resources in the PSE as they would use to create and manage resources in the cloud provider network 100 region.

The PSE may be pre-configured, e.g. by the provider network operator, with the appropriate combination of hardware with software and/or firmware elements to support various types of computing-related resources, and to do so in a manner that mirrors the experience of using the cloud provider network 100. For example, one or more PSE servers can be provisioned by the cloud provider within the customer network. As described above, the cloud provider network 100 may offer a set of predefined instance types, each having varying types and quantities of underlying hardware resources. Each instance type may also be offered in various sizes. In order to enable customers to continue using the same instance types and sizes in their PSE as they do in the cloud provider network 100 region, the PSE server can be a heterogeneous server. A heterogeneous server can concurrently support multiple instance sizes of the same type, and may be also reconfigured to host whatever instance types are supported by its underlying hardware resources. The reconfiguration of the heterogeneous server can occur on-the-fly using the available capacity of the PSE server, meaning while other VMs are still running and consuming other capacity of the PSE server. This can improve utilization of resources within the PSE by allowing for better packing of running instances on physical hosts, and also provides a seamless experience regarding instance usage across the cloud provider network 100 region and PSE.

In the manner described above, a PSE forms an edge location, in that it provides the resources and services of the cloud provider network outside of a traditional cloud provider data center and closer to customer devices. An edge location, as referred to herein, can be structured in several ways. In some implementations, an edge location can be an extension of the cloud provider network substrate including a limited quantity of capacity managed by the cloud provider but provided outside of a traditional availability zone (e.g., in a small data center or other facility of the cloud provider that is located close to a customer workload and that may be distant from any availability zones). Such edge locations may be referred to as local zones (due to being more local or proximate to a group of users than traditional availability zones). A local zone may be connected in various ways to a publicly accessible network such as the Internet, for example directly, via another network, or via a private connection to a region. Although typically a local zone would have more limited capacity than a region, in some cases a far zone may have substantial capacity, for example thousands of racks or more.

In some implementations, an edge location may be an extension of the cloud provider network substrate formed by one or more servers located on-premise in a customer or partner facility, wherein such server(s) communicate over a network (e.g., a publicly-accessible network such as the Internet) with a nearby availability zone or region of the cloud provider network. This type of substrate extension located outside of cloud provider network data centers can be referred to as an "outpost" of the cloud provider network. Some outposts may be integrated into communications networks, for example as a multi-edge cloud having physical infrastructure spread across telecommunication data centers, telecommunication aggregation sites, and/or telecommunication base stations within the telecommunication network. In the on-premise example, the limited capacity of the outpost may be available for use only be the customer who owns the premises (and any other accounts allowed by the customer). In the telecommunications example, the limited capacity of the outpost may be shared amongst a number of applications (e.g., games, virtual reality applications, healthcare applications) that send data to users of the telecommunications network.

An edge location can include data plane capacity controlled at least partly by a control plane of a nearby availability zone. As such, an availability zone group can include a "parent" availability zone and any "child" edge locations homed to (e.g., controlled at least partly by the control plane of) the parent availability zone. Certain limited control plane functionality (e.g., features that require low latency communication with customer resources, and/or features that enable the edge location to continue functioning when disconnected from the parent availability zone) may also be present in some edge locations. Thus, in the above examples, an edge location refers to an extension of at least data plane capacity that is positioned at the edge of the cloud provider network, close to customer devices and/or workloads.

Dynamic Storage Volume Configuration in the
Example Computing Environment

A customer 150 may generate, modify, and delete data during operations. For example, the customer 150 may execute workloads that process data, and such data processing may affect a storage volume of production data 152. To ensure that the production data 152 remains available in the case of a failure (e.g., storage failure, computing system failure, networking failure, disaster, etc.), a backup copy of production data 152 may be stored. The cloud provider network 100 may include a continuous backup manager 140 that manages storing one or more copies of the production data 152. Illustratively, the continuous backup manager 140 may manage one or more backup volumes in one or more block store servers 124 to back up the production data 152.

As the customer 150 performs write operations to the production data 152, a corresponding write operation is made to a backup volume.

In some embodiments, as shown in FIG. 1, a customer 150 may have a volume of production data 152 on-premises at a customer site. Customers with workloads on-premises can use the cloud provider network 100 as a cloud-based secondary data center. The cloud provider network 100 can provide better reliability, availability, and security than on-premises secondary data centers without requiring duplicate hardware, compute, networking, and software.

In some embodiments, a customer 150 may have a volume of production data 152 on premises at a customer site, and may use an on-site PSE as a secondary data center. This provides customers with the benefits of cloud-based secondary data centers, including lower latency, greater performance and security, and reduced costs, without the need to access the internet or cloud provider network 100. Recovery from on-premises to a PSE can also serve as a mid-point before moving to the cloud provider network 100.

In some embodiments, a customer 150 may have a volume of production data 152 in the cloud provider network 100, such as a volume at a block store server 124 that is being accessed by a workload executing on a compute server 122. To protect the volume of production data 152 at the block store server 124, the data may be backed up to a backup volume on a block store server 124 in a different region or availability zone of the cloud provider network 100.

In some embodiments, a customer 150 may have a volume of production data 152 in one cloud provider network 100, such a volume at a block store server 124 that is being accessed by a workload executing on a compute server 122. To protect the volume of production data 152 at the block store server 124, the data may be backed up to a backup volume on a block store server 124 in a different cloud provider network 100.

The continuous backup manager 140 may manage dynamic configuration of backup volumes depending upon the performance required at the present time. For example, the continuous backup manager 140 may dynamically change the backup volume being used for a volume of production data 152 from a first volume, such as an LTV, to a second volume, such as an HTV. The switch may be made to ensure certain objectives are satisfied (e.g., disaster recovery RPO) while also ensuring that the lowest-cost volume is used when possible, so long as the lowest-cost volume satisfies the objective. Examples of dynamic backup volume configuration based on disaster recovery objectives are described in greater detail below.

In some embodiments, a block store server 124 or some other module or component of the cloud provider network 100 may include a dynamic volume configuration manager 130 to manage dynamic configuration of storage volumes as part of—or independent of—disaster recovery backup processes. For example, the dynamic volume configuration manager 130 may dynamically change the volume being used to store data based on volume performance metrics with respect to the data write operations being performed, regardless of whether the volume is a backup of production data 152 or is the production data 152 itself. Examples of dynamic volume configuration based on volume performance metrics are described in greater detail below.

Example Recovery Objective Based Management of Storage Volumes

Figure 2:
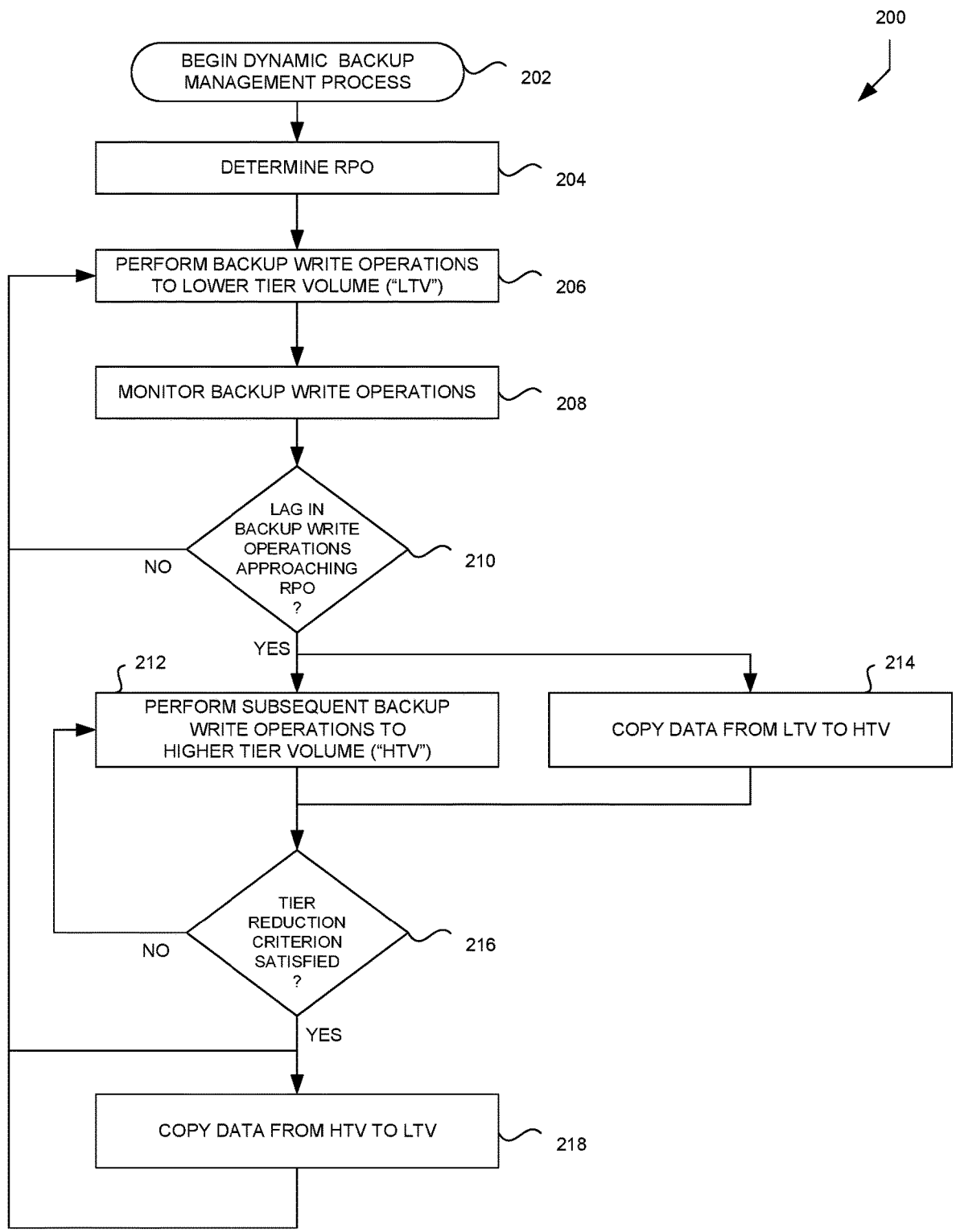
FIG. 2 is a flow diagram of an illustrative routine for continuous backup management with dynamic configuration of backup volumes according to some embodiments.

FIG. 2 is a flow diagram of an example routine 200 for managing the dynamic configuration of backup volumes based on recovery point objectives for volumes of production data 152 (also referred to simply as "production volumes"). The routine 200 will be described with further reference to the example data flows and interactions shown in FIGS. 3, 4, and 5.

The routine 200 beings at block 202. In some embodiments, the routine 200 may begin in response to an event, such as initiation of a backup process for a volume of production data.

At block 204, the continuous backup manager 140 or some other module or component may determine a recovery point objective for backing up the volume of production data. In some embodiments, a customer 150 may specify an RPO for a volume of production data 152. For example, the RPO may indicate a maximum amount of data permitted to be lost (e.g., not yet backed up) in case of a failure of the volume of production data 152. Illustratively, the RPO may be defined in units of time, such as 15 minutes, 1 hour, 4 hours, or 1 day. Thus, the RPO may be considered to be the maximum time lag between the point in time that data is written to the volume of production data 152 and the point in time that a corresponding data write operation is made to a backup volume to back up the data written to the volume of production data 152. In the case of a failure of the production volume 152, any lag that exceeds the RPO, such as a lag of 20 minutes for an RPO of 15 minutes, would result in a loss of data beyond that permitted by the RPO. In this example, any data written to the production volume from 15-20 minutes before the time of failure would be lost above and beyond the 15 minutes permitted by the RPO.

The continuous backup manager 140 may determine the RPO based on a request from a customer system 150 to begin continuous backup services for a production volume 152. For example, a request may include parameters for the backup services, including RPO, a capacity of the production volume 152, performance parameters of the production volume, predicted usage of the production volume 152 (e.g., IOPS), other parameters, or some combination thereof. In some embodiments, the continuous backup manager 140 may determine the RPO based on predetermined settings, such as a standard or default RPO.

The continuous backup manager 140 may have multiple different volume types available to use to store data. The different volume types may have different performance characteristics, such as available throughput, capacity, or other parameters. In some embodiments, the different volume types may be organized into tiers based on performance characteristics of the volumes. For example, a first tier may include volumes that provide a baseline level of performance in terms of throughput, capacity, etc. A second tier may include volumes that provide a higher degree of performance than volumes in the first tier. Thus, the first tier may be referred to as a lower or lowest tier, and a volume in the first tier may be referred to as a lower-tier volume ("LTV") to reflect its relative performance in comparison with volumes in the second tier. The second tier may be referred to as a higher or highest tier, and a volume in the second tier may be referred to as a higher-tier volume ("HTV") to reflect its relative performance in comparison with volumes in the first tier. In some embodiments, there may be three or more different volume types organized into three or more tiers. For example, in addition to a first tier of LTVs and a second tier of HTVs, there may be a third tier of volumes that provide an intermediate degree of performance in comparison with LTVs and HTVs. A volume in this tier may be referred to as an intermediate-tier volume ("ITV").

Use of volumes in the different tiers (e.g., different volume types or otherwise volumes with different configurations) may incur different costs in terms of computing resources to provide the different degrees of performance, financial costs charged to customers, and the like. The dynamic changes in backup volume configuration provided by the continuous backup manager 140 allow use of volumes in lower-cost tiers when doing so will satisfy the RPO. Volumes in higher-cost tiers are dynamically employed as needed to ensure continued satisfaction of the RPO.

At block 206, the continuous backup manager 140 or some other module or component may store data to a backup storage volume in response to data being written to the volume of production data 152. In some embodiments, the continuous backup manager 140 begins the process of providing continuous backup services to a customer 150 using an LTV. In other embodiments, the continuous backup manager may begin the process of providing continuous backup services to a customer using a higher-performance volume, such as an ITV or HTV. For example, the continuous backup manager 140 may allow a customer to specify a baseline volume type to be used initially, or the continuous backup manager 140 may dynamically determine a volume type based on parameters associated with a request to provide continuous backup services.

Figure 3:
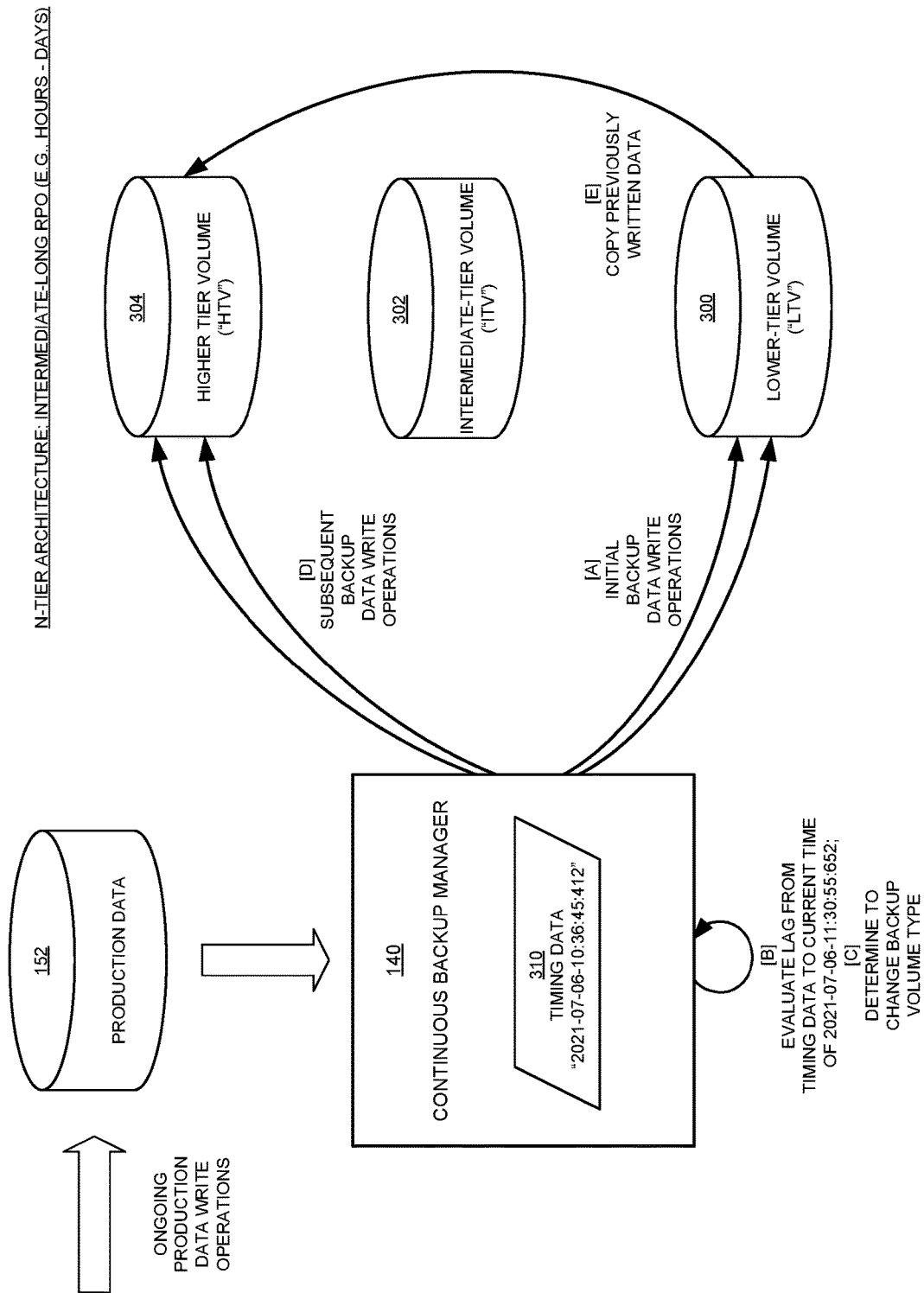
FIG. 3 is a block diagram of illustrative data flows and interactions of a continuous backup manager and multiple backup data volumes according to some embodiments.

FIG. 3 illustrates an example in which the RPO is mid-length, such as 1 hour. The continuous backup manager 140 initially selects a lower-throughput volume LTV 300 to conserve storage costs (computing resources, financial resources, etc.). As data write operations are performed on the production volume 152, the continuous backup manager 140 may make corresponding write operations on the LTV 300 at [A]. In some embodiments, the continuous backup manager 140 may receive notifications of any data write operations to the production volume 152. In some embodiments, the continuous backup manager 140 or a component thereof may be present in an I/O path of the production volume 152 so that corresponding data write operations to the LTV 300 may be initiated automatically. The corresponding data write operations to the LTV 300 may be performed subject to the performance characteristics of the LTV 300. For example, the LTV 300 may have a relatively low throughput (e.g., in terms of megabytes per second and/or IOPS) in comparison with the production volume 152 and/or other volume types, and therefore there may be a lag in performing corresponding write operations to the LTV 300. Illustratively, such lags may occur in periods during which a large number of write operations are performed with respect to the production volume 152, when a large amount of data is written to the production volume 152 at once, etc. In such cases, the corresponding backup data write operations to the LTV 300 may be delayed.

Figure 4:
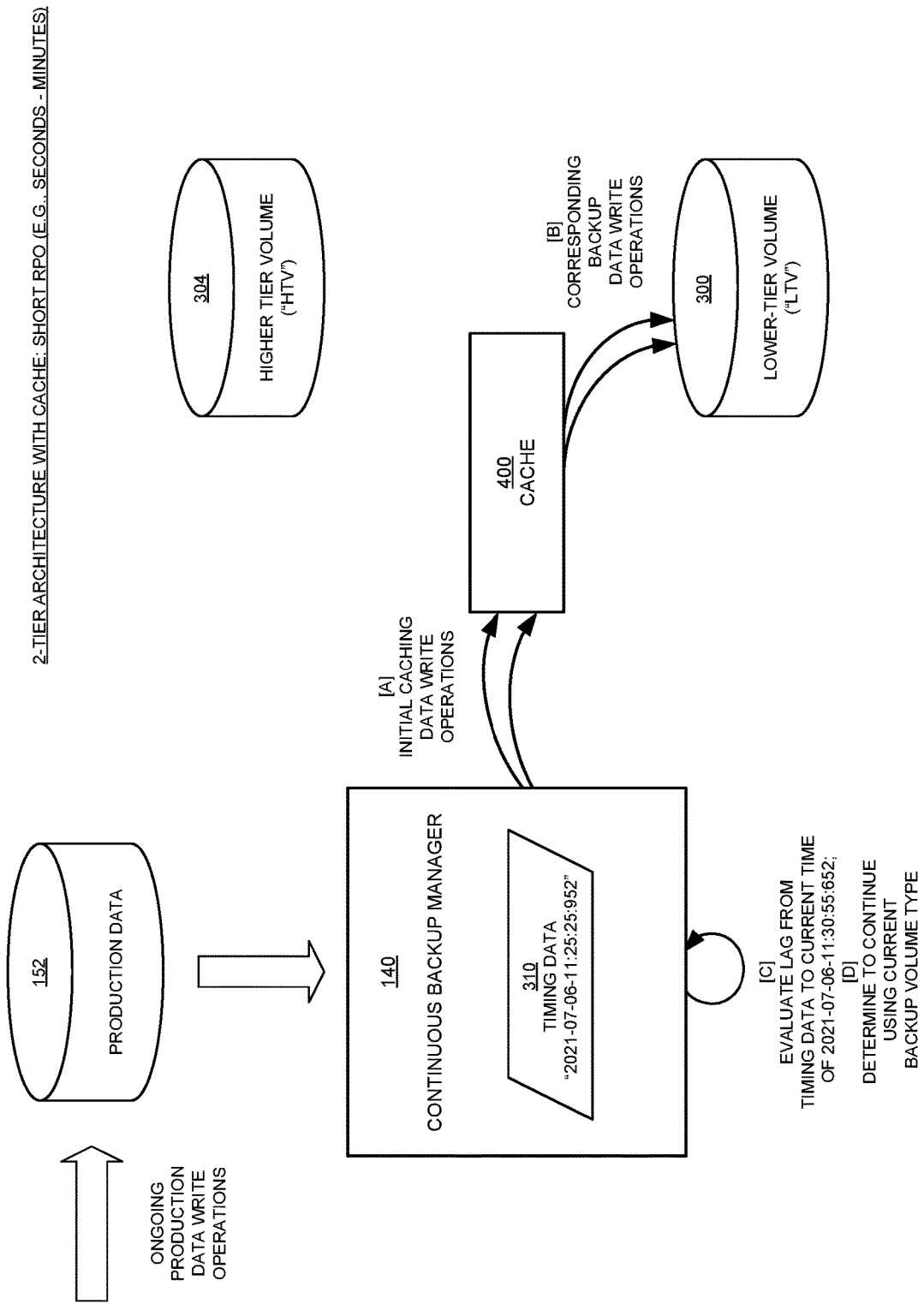
FIG. 4 is a block diagram of illustrative data flows and interactions of a continuous backup manager and multiple backup data volumes according to some embodiments.

FIG. 4 illustrates an example in which the RPO is relatively short, such as 15 minutes. The continuous backup manager 140 initially selects a lower-throughput volume LTV 300 to conserve storage costs or other resources of the customer. However, because the measurement of lag or other metrics used later in the routine 200 have some degree of latency, there may be an increased risk of a lag exceeding the RPO before the continuous backup manager 140 is able to dynamically configure use of a different volume with higher throughput. This scenario may give rise to a greater loss of data than permitted under the RPO. To mitigate this possibility while still taking advantage of the LTV 300 as the initial backup volume, backup data write operations may be made to a higher throughput cache 400 prior to being persisted in the LTV 300. The cache 400 may be limited in capacity to minimize costs, while still providing enough storage that the continuous backup manager 140 can detect a lag approaching the RPO and dynamically reconfigure use of backup volumes accordingly.

At block 208, the continuous backup manager 140 or some other module or component may monitor the lag associated with performing write operations to the LTV 300 that correspond to write operations performed to the production data 152. In some embodiments, each write operation to the production data 152 may be associated with a timestamp. For example, when a write operation is initiated, completed, or notified to the continuous backup manager 140, a timestamp may be generated and associated with the write operation. The continuous backup manager 140 may monitor the timestamp of the last write operation for which a corresponding write operation has been performed with respect to the backup volume and/or the next write operation for which a corresponding write operation is to be performed with respect to the backup volume.

At decision block 210 the continuous backup manager 140 or some other module or component may determine whether the lag in performing write operations to the backup volume approaches the RPO. In some embodiments, the determination may be based on a percentage or absolute threshold. For example, if the lag reaches a threshold percentage of the RPO (e.g., 80%, 90%, 95%), then the lag may be considered to be approaching the RPO and the routine 200 may proceed to block 212. As another example, if the lag reaches a threshold amount for the current RPO (e.g., if the lag reaches 12 minutes for an RPO of 15 minutes), then the routine 200 may proceed to block 212.

FIG. 3 illustrates an example in which the RPO is 1 hour, and the timestamp 310 of the last or next production write operation for which a backup write operation is performed is "2021-07-06-10:36:45:412" (in "yyyy-MM-dd-HH-mm-ss-SSS" format, where yyyy=year, MM=month of year, dd=day of month, HH=hour of day, mm=minute of hour, ss=second of minute, and SSS=millisecond of second). The current time (e.g., as determined using a system clock) is "2021-07-06-11:30:55:652." In this example, the lag determined at [B] as the difference of the timestamp 310 and current time exceeds 90% of the RPO, and the threshold for dynamically reconfiguring the backup volume may be 90%. Thus, at [C] continuous backup manager 140 may determine to change the backup volume type. The routine 200 may proceed to block 212. The routine 200 may also proceed to block 214 in parallel or asynchronously with block 212.

FIG. 4 illustrates an example in which the RPO is 15 minutes, the timestamp 310 of the last write operation performed with respect to the production data 152 is "2021-07-06-11:25:25:952" (in "yyyy-MM-dd-HH-mm-ss-SSS" format, where yyyy=year, MM=month of year, dd=day of month, HH=hour of day, mm=minute of hour, ss=second of minute, and SSS=millisecond of second). The current time 412 (e.g., as determined using a system clock) is "2021-07-06-11:30:55:652." In this example, the lag determined at [C] as the difference of the timestamp 310 and current time is less than the RPO-based threshold. Thus, at [C] continuous backup manager 140 may determine to not change the backup volume type. The routine 200 may return to block 206.

At block 212, the continuous backup manager 140 or some other module or component may initiate performance of data write operations to a higher throughput volume than was initially being used.

In embodiments that use an N-tier architecture (e.g., 3 or more tiers), like that shown in FIG. 3, there may be an LTV 300, an ITV 302, and an HTV 304. The continuous backup manager 140 may move directly from the LTV 300 to the HTV 304 in order to ensure that the RPO is satisfied, even though there is an ITV with a throughput, cost, and other attributes between those of the LTV and HTV. Subsequent backup data write operations may be performed to the selected backup volume at [D]. In some embodiments, the continuous backup manager 140 may move step-wise up such an N-tier architecture. For example, the continuous backup manager 140 may first switch from performing backup data write operations on the LTV 300 to performing subsequent backup data write operations on the ITV 302. If the continuous backup manager 140 then determines that the ITV is also unable to satisfy the RPO, the continuous backup manager 140 may switch to performing backup data write operations to the HTV 304.

In embodiments that use a 2-tier architecture, like that shown in FIG. 4, there may be an LTV 300 and an HTV 304. If or when the continuous backup manager 140 determines to switch backup volumes, the switch may therefore be from performing backup data write operations on the LTV 300 to performing subsequent backup data write operations on the HTV 304.

At block 214, the continuous backup manager 140 or some other module or component may copy data from the prior backup volume to the current backup volume. The copy operation may be performed so that a complete copy of the production volume 152 is available on the current backup volume in the event that the current backup volume is used to restore the production volume 152. In some embodiments, the copy operation may be performed in parallel with performing backup write operations that correspond to write operations to the production data 152. In some embodiments, the copy operation may be performed asynchronously with performing backup write operations that correspond to write operations to the production data 152. In some embodiments, the block store server 124 or a component thereof, such as the dynamic volume configuration manager 130, may perform the copy of data from the prior backup volume to the current backup volume without management by the continuous backup manager 140. FIG. 3 illustrates an embodiment that includes the copying of previously written backup data from the LTV 300 to the HTV 304 at [E].

In some embodiments, data is not copied from the prior backup volume to the current backup volume. For example, the storage of data may be split among different volumes, and the continuous backup manager 140, the block store server 124, or some other system or component may manage the data as a single logical volume even if the data is spread across two or more physical volumes. As another example, the same physical storage volume may be used, but associated properties may be dynamically changed to provide different degrees of performance. Thus, there is no need to copy data to a different volume.

At decision block 216, the continuous backup manager 140 or some other module or component may determine whether a tier reduction criterion has been satisfied. The determination may be made in order to determine whether and when to move to a lower-throughput and lower-cost volume if the volume is able to satisfy the RPO. In some embodiments, the tier reduction criterion may relate to a lag in performing data write operations to the HTV. For example, tier reduction criterion may be satisfied if the lag falls below a threshold value or percentage of the RPO and/or remains below the threshold for a period of time (e.g., equal to RPO or some fraction or multiple thereof).

Figure 5:
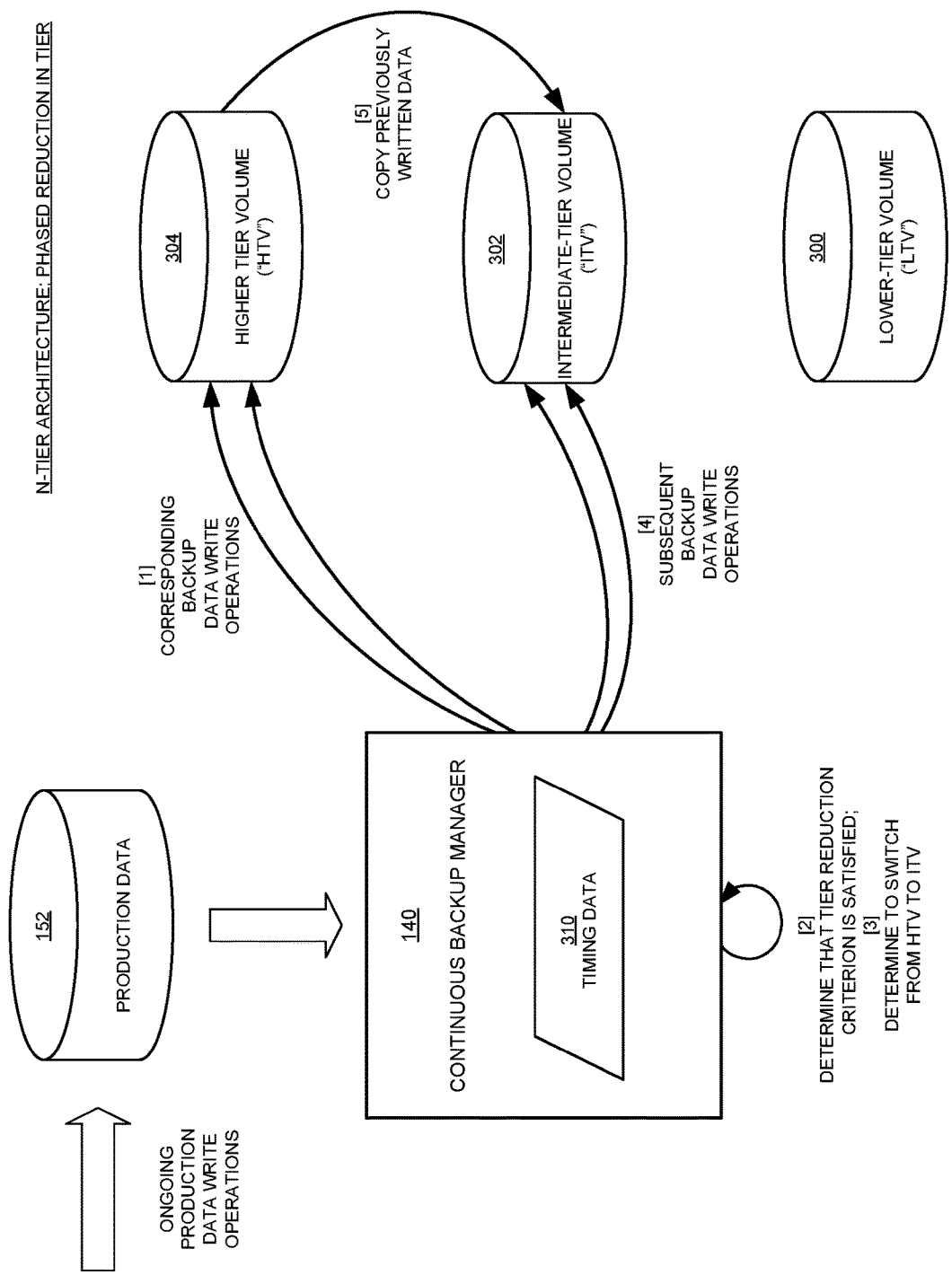
FIG. 5 is a block diagram of illustrative data flows and interactions of a continuous backup manager and multiple backup data volumes according to some embodiments.

FIG. 5 illustrates an example in which a tier reduction process is performed in response to determining that a tier reduction criterion is satisfied. As shown, backup data write operations are being performed at [1] to an HTV 304, such as in response to the switch from the LTV 300 to HTV 300 shown in FIG. 3. At [2], the continuous backup manager 140 determines that one or more tier reduction criteria have been satisfied, and in response the continuous backup manager 140 determines at [3] to switch from performing backup data write operations to the HTV 304 to performing backup data write operations to a lower-tier, lower-cost backup data volume. In the illustrated example with an N-tier architecture, the continuous backup manager 140 switches to using an ITV 302 when reducing tiers rather than going back to the LTV 300 that was used previously. In some embodiments, the continuous backup manager 140 switches to the type of volume that was used immediately prior to the current volume type (e.g., switches back to using the LTV 300), or switches to using a volume in the lowest-tier (e.g., switches to using the LTV 300).

At block 218, the continuous backup manager 140 can copy previously-written backup data from the current volume to the new volume. The copy operation may be performed so that a complete copy of the production volume 152 is available on the new backup volume in the event that the new backup volume is used to restore the production volume 152. In some embodiments, the copy operation may be performed in parallel with block 206, where backup write operations to be performed subsequent to reduction in tier are performed with respect to the new backup volume. In some embodiments, the copy operation may be performed asynchronously with performing subsequent backup write operations. FIG. 5 illustrates at [4] the performance of subsequent backup write operations to the newly-selected ITV 302, and at [5] the copying of previously written backup data from the HTV 304 to the ITV 302. In some embodiments, data is not copied from the prior backup volume (e.g., the HTV 304) to the current backup volume (ITV 302). For example, the storage of data may be split among different volumes, and the continuous backup manager 140, the block store server 124, or some other system or component may manage provision of the data as a single logical volume even if the data is spread across two or more physical volumes.

The routine 200 may continue in an iterative loop in which the continuous backup manager 140 dynamically configures use of backup volumes by selecting volumes at different tiers, as needed, to maintain the lowest cost while ensuring that the RPO remains satisfied at all times. At any given point during the routine, a failure of the production volume 152 or some other event may occur, and a backup of the production volume 152 may be obtained from the currently-used backup volume.

Example Volume Performance Based Management of Storage Volumes

Figure 6:
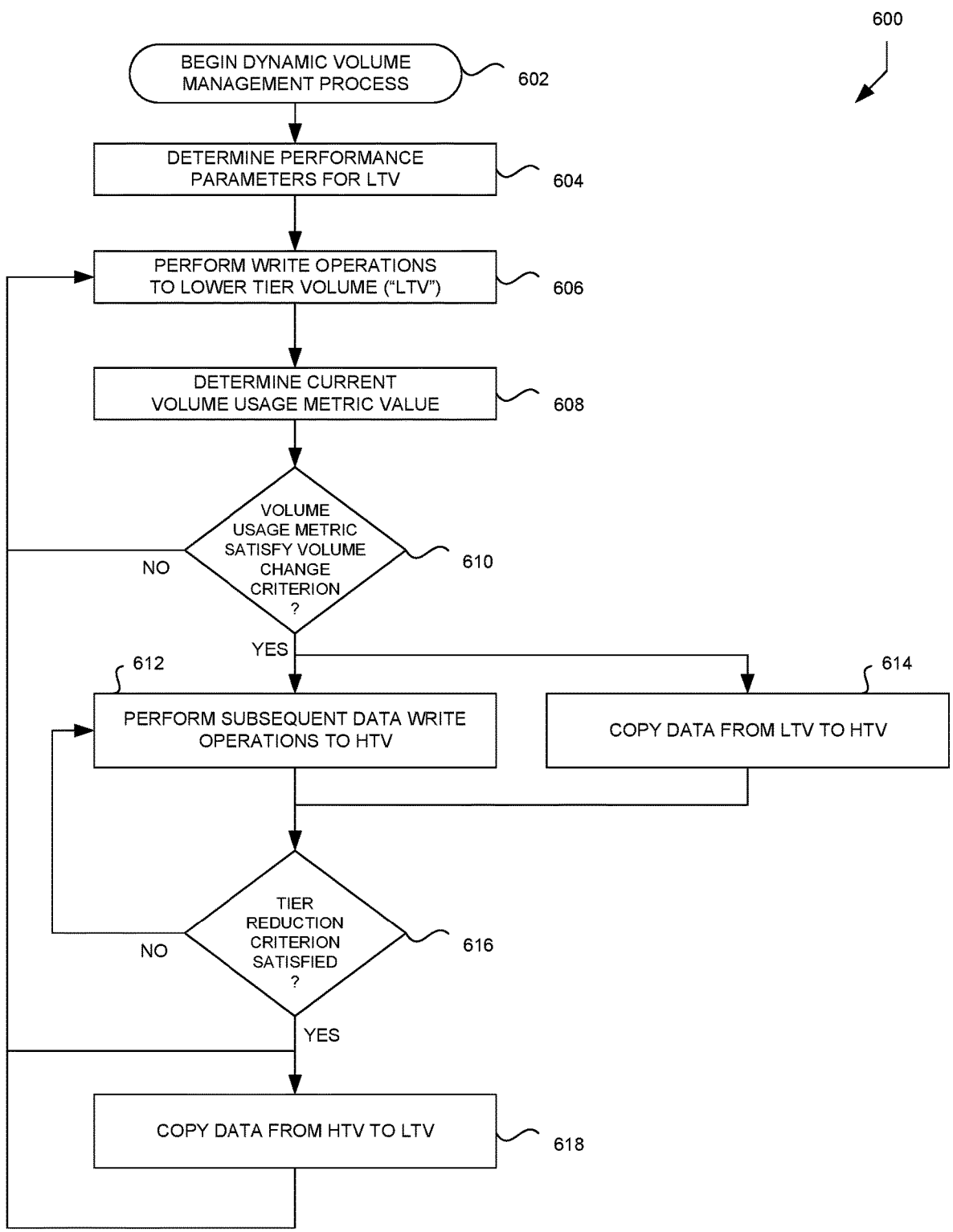
FIG. 6 is a flow diagram of an illustrative routine for dynamic volume configuration management according to some embodiments.

FIG. 6 is a flow diagram of an example routine 600 for managing the dynamic configuration of storage volumes based on volume usage metrics associated with the storage volumes. The routine 600 will be described with further reference to the example data flows and interactions shown in FIGS. 7 and 8.

The routine 600 beings at block 602. The routine 600 may begin in response to an event, such as initiation of a data storage process. In some embodiments, the routine 600 may be performed to manage backup data volumes for storage of backups of production data. For example, routine 600 and dynamic volume configuration manager 130 may be used instead of, or in addition to, the continuous backup manager 140 described in greater detail above. In some embodiments, a dynamic volume configuration manager 130 may be implemented and may execute routine 600 to provide cost-efficient automatic reconfiguration of data storage volumes for any of wide array of data storage tasks, not limited to backing up a production volume. For example, the dynamic volume configuration manager 130 may execute routine 600 to provide automatic dynamically reconfigurable data storage by default or as an optional service to all users of—and all use cases associated with—the block store servers 124 of the cloud provider network 100.

At block 604, the dynamic volume configuration manager 130 or some other module or component may determine performance parameters for a first volume to be used in a storage process. In some embodiments, a performance parameter of the first volume may relate to an available throughput of the volume. For example, an initial volume may have a maximum IOPS limit, also referred to as a "burst limit."

In some embodiments, input/output ("I/O") operations to the first volume, including data read and data write operations, may be artificially throttled or limited subject to a policy rather than (or in addition to) limitations inherent in the hardware, software, and communication components being used. For example, a token bucket algorithm may be used to manage the quantity and rate of I/O operations for the first volume. Tokens may be added to the bucket at a predetermined or dynamically determined rate, such as x tokens per second. Each I/O operation that is performed on the storage volume may reduce the number of accumulated tokens in the bucket. Thus, the baseline IOPS corresponds to the rate at which tokens are provided to the user (e.g., if x tokens per second are added to the bucket, then x IOPS is the baseline for the volume). Tokens may accumulate in the token bucket during idle period and other periods in which the tokens are used at a rate less than that at which new tokens are added to the token bucket. A user of the volume may be permitted to perform a burst of more IOPS for a period of time if there are enough tokens available in the bucket. For example, I/O operations may be performed at 2×, 5×, 10×, or more (where x is the baseline for the volume). Some embodiments may impose a burst limit that defines the maximum rate at which I/O operations may be performed, even if there are enough tokens available to perform more I/O operations for a period of time (e.g., only 10× I/O operations in a second, or only 100× I/O operations in a second, even if there are more tokens available in the token bucket).

In some embodiments, the number of tokens that may accumulate in a token bucket may be limited, even during an idle period in which more tokens could and would otherwise be added to the bucket (e.g., at a rate of x tokens per second). To determine at any given time how many tokens are available in a token bucket, a volume usage metric may be used. For example, the volume usage metric may be a burst balance that takes a value representing a percentage between 0% and 100%, where 100% corresponds to the maximum number of tokens permitted in the bucket.

The dynamic volume configuration manager 130 may have multiple different volume types available to use to store data. The different volume types may have different performance characteristics, such as available throughput, capacity, burst limits, or other parameters. In some embodiments, the different volume types may be organized into tiers based on performance characteristics of the volumes, as described in greater detail above. For example, a first tier may include LTVs that provide a baseline level of performance in terms of throughput, capacity, etc. A second tier may include HTVs that provide a higher degree of performance than volume in the first tier. In some embodiments, an N-tier architecture may be used in which there are three or more different volume types organized into three or more tiers, including LTVs, ITVs, and HTVs. Use of volumes in the different tiers may incur different costs in terms of computing resources to provide the different degrees of performance, financial costs charged to customers, and the like. The dynamic changes in data storage volume configuration provided by the dynamic volume configuration manager 130 allow use of volumes in lower-cost tiers when doing so will provide desired or necessary performance. Volumes in higher-cost tiers are dynamically employed as needed to ensure desired or necessary performance.

At block 606, the dynamic volume configuration manager 130 or some other module or component may store data to a first storage volume. In some embodiments, the dynamic volume configuration manager 130 begins the process of storing data to dynamically-reconfigurable data storage volumes using an LTV. In other embodiments, the dynamic volume configuration manager 130 may begin the process using a higher-performance volume, such as an ITV or HTV. For example, the dynamic volume configuration manager 130 may allow a customer to specify a baseline volume type to be used initially, or the dynamic volume configuration manager 130 may dynamically determine a volume type based on parameters associated with a storage initiation request.

Figure 7:
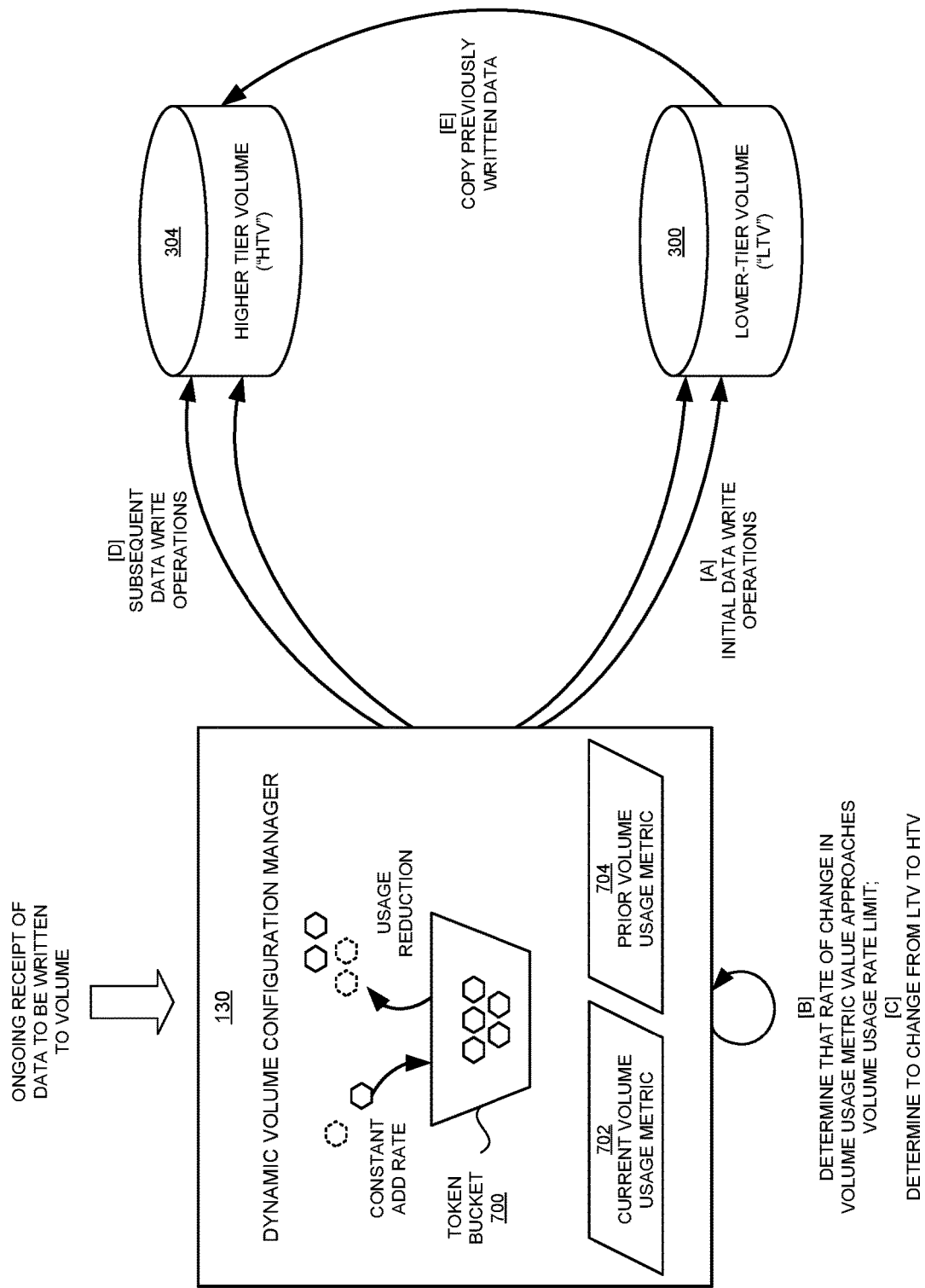
FIG. 7 is a block diagram of illustrative data flows and interactions of a dynamic volume configuration manager and multiple data storage volumes according to some embodiments.
Figure 8:
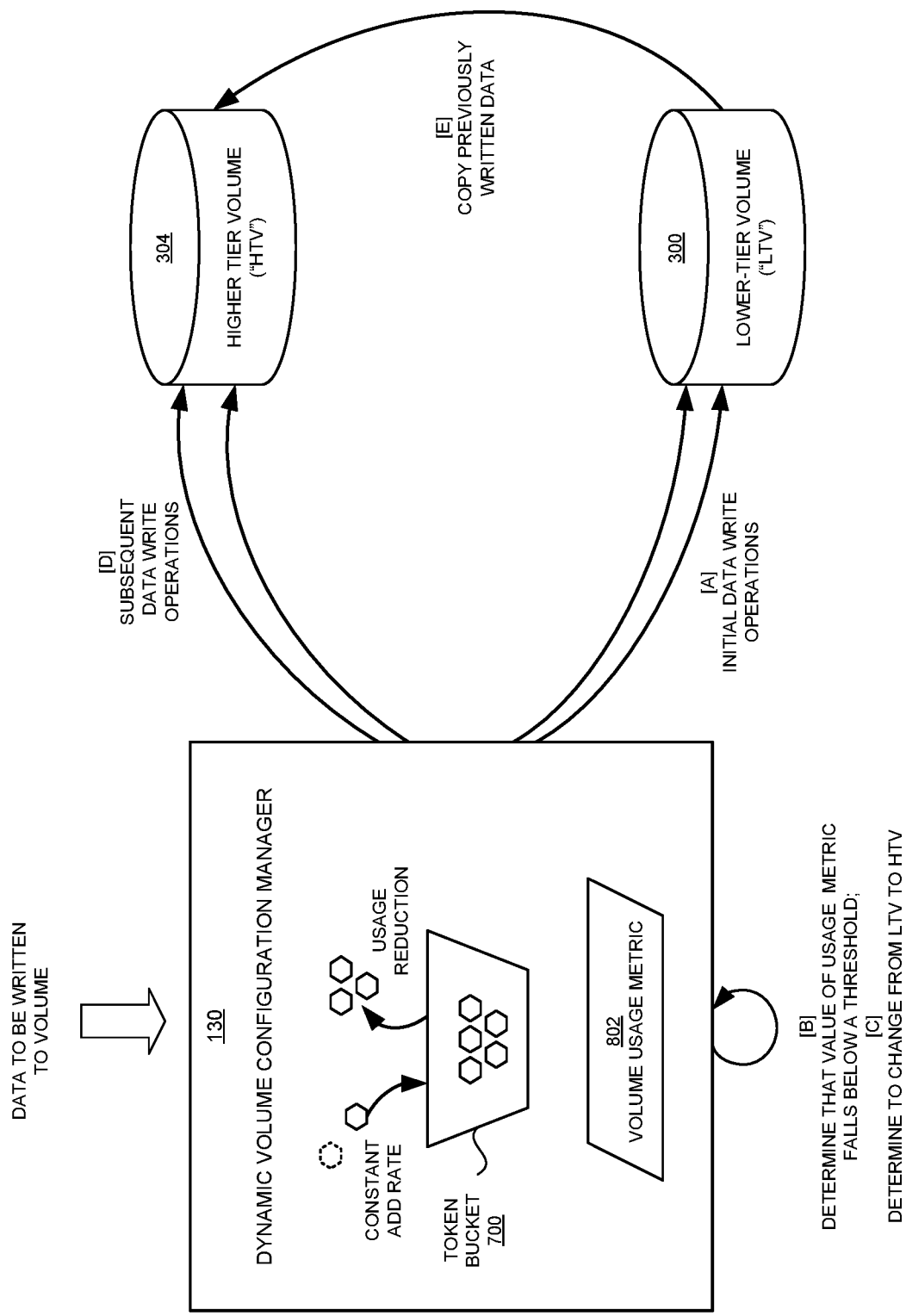
FIG. 8 is a block diagram of illustrative data flows and interactions of a dynamic volume configuration manager and multiple data storage volumes according to some embodiments.

FIGS. 7 and 8 illustrates examples in which initial data write operations are performed to an LTV 300 at [A]. I/O operations on the LTV may be managed using a token bucket 700 in which x tokens are added every unit of time (e.g., x tokens per second) and n tokens are removed for each I/O operation performed on the LTV 300 (e.g., 1 token per data write or data read operation). Although the description that follows focuses on examples using a token bucket 700 to manage data write operations, the same methods may be applied to all I/O operations, including data read operations.

At block 608, the dynamic volume configuration manager 130 or some other module or component may determine the current value of a volume usage metric associated with the storage volume being used. If the volume usage metric is a burst balance, the dynamic volume configuration manager 130 may determine a percentage of the maximum number tokens that are available in the token bucket (e.g., a value between 0-100). In some embodiments, the dynamic volume configuration manager 130 may maintain token bucket balances, including token additions and removals, and may therefore have direct access to the volume usage metric. In some embodiments, a different module or component may maintain the token bucket balance, such as the storage volume being used or a controller thereof. The dynamic volume configuration manager 130 may query or be notified of the volume usage metric maintained by this component.

At decision block 610, the dynamic volume configuration manager 130 or some other module or component may determine whether the volume usage metric satisfies one or more volume change criteria. A volume change criterion may be evaluated to determine whether to change from storing data in current data storage volume to storing data in a different storage volume, such as one with performance parameters associated with a higher degree of performance than the current data storage volume.

FIG. 7 illustrates an example in which evaluation of the volume change criterion involves determining a rate at which the value of the volume usage metric changes over time. As shown, the dynamic volume configuration manager 130 may determine a current value 702 of the volume usage metric, and a prior value 704 of the volume usage metric. The prior value 704 may be from an immediately-preceding point of time (e.g., the volume usage metric value may be sampled every minute, second, or set of milliseconds), from the last time the volume usage metric was updated, or from a time at the beginning of an analysis window of time (e.g., where the analysis window is defined in terms of hours, minutes, or seconds). If the volume usage metric is a burst balance, then the current value 702 and previous value 704 may be whole or decimal numbers representing a percentage of a maximum quantity of tokens available in the token bucket 700. A difference between the current value 702 and previous value 704 may be computed, and from that difference a rate of change in the value of the volume usage metric may be determined. For example, the rate of change may be computed as the average rate of change over an analysis window of time. The rate of change may be evaluated against a threshold, such as the burst limit for the current storage volume (e.g., the LTV 300 in this example) to determine whether the rate of change meets or exceeds the threshold. For example, the threshold may be set to a relatively high value, such as 90-95% of the burst limit for the LTV 300, indicating that the burst balance may not decrease at a rate faster than 90-95% of the burst limit for the volume. In the illustrated example, the dynamic volume configuration manager 130 determines at [B] that the change in value of the volume usage metric exceeds the maximum threshold. Based on this determination, the dynamic volume configuration manager 130 can determine at [C] to change from using the LTV 300 to an HTV 304. The routine 600 may proceed to block 612. The routine 600 may also proceed to block 614 in parallel or asynchronously with block 612.

FIG. 8 illustrates an example in which evaluation of the volume change criterion is based on a current value of the volume usage metric 802. If the volume usage metric 802 is a burst balance, then the current value of the burst balance may be evaluated against a threshold, such as a minimum threshold, to determine whether the burst balance meets or falls short of the threshold. For example, the threshold may be set to a relatively low value, such as 5 or 10, indicating that at least 5% or 10%, respectively, of the maximum quantity of tokens are to be available in the token bucket 700. In the illustrated example, the dynamic volume configuration manager 130 determines at [B] that the current value of the burst balance falls short of the minimum threshold. Based on this determination, the dynamic volume configuration manager 130 can determine at [C] to change from using the LTV 300 to an HTV 304. The routine 600 may proceed to block 612. The routine 600 may also proceed to block 614 in parallel or asynchronously with block 612.

At block 612, the dynamic volume configuration manager 130 or some other module or component may initiate performance of data write operations to a higher throughput volume than was initially being used. In embodiments that use a 2-tier architecture, like that shown in FIGS. 7-8, there may be an LTV 300 and an HTV 304. If or when the dynamic volume configuration manager 130 determines to switch data volumes volumes, the switch may therefore be from performing data write operations on the LTV 300 to performing subsequent data write operations on the HTV 304 at [D].

In embodiments that use an N-tier architecture (e.g., 3 or more tiers), like that shown in FIG. 3, there may be an LTV 300, an ITV 302, and an HTV. The dynamic volume configuration manager 130 may move directly from the LTV 300 to the HTV 304, even though there is an ITV with a throughput, cost, and other attributes between those of the LTV and HTV. Subsequent data write operations may be performed to the selected data volume. In some embodiments, the dynamic volume configuration manager 130 may move step-wise up such an N-tier architecture. For example, the dynamic volume configuration manager 130 may first switch from performing data write operations on the LTV 300 to performing subsequent data write operations on the ITV 302.

At block 614, the dynamic volume configuration manager 130 or some other module or component may copy data from the prior data storage volume to the current data storage volume. The copy operation may be performed so that a complete copy of the data saved to the volume(s) is available on the current data storage volume. In some embodiments, the copy operation may be performed in parallel with performing data write operations to the newly-selected volume. In some embodiments, the copy operation may be performed asynchronously with performing data write operations to the newly-selected volume. FIGS. 7-8 illustrates at [E] the copying of previously written data from the LTV 300 to the HTV 304.

In some embodiments, data is not copied from the prior storage volume (e.g., the LTV 300) to the current storage volume (HTV 304). For example, the storage of data may be split among different volumes, and the dynamic volume configuration manager 130 or some other module or component may manage provision of the data as a single logical volume even if the data is spread across two or more physical volumes. As another example, the same physical storage volume may be used, but associated properties may be dynamically changed to provide different degrees of performance. Thus, there is no need to copy data to a different volume.

At decision block 616, the dynamic volume configuration manager 130 or some other module or component may determine whether a tier reduction criterion has been satisfied. The determination may be made in order to determine whether and when to move to a lower-throughput and lower-cost volume. If the tier reduction criterion has been satisfied, the routine 600 may proceed to block 618. Otherwise, if the tier reduction criterion has not been satisfied, the routine 600 may return to block 612.

At block 618, the dynamic volume configuration manager 130 can copy previously-written data from the current volume to the new volume. The copy operation may be performed so that a complete copy of data written to the volume(s) is available on the new volume. In some embodiments, the copy operation may be performed in parallel with block 606, where data write operations to be performed subsequent to reduction in tier are performed with respect to the new data storage volume. In some embodiments, the copy operation may be performed asynchronously with performing subsequent data write operations.

The routine 600 may continue in an iterative loop in which the dynamic volume configuration manager 130 dynamically configures use of data storage volumes by selecting volumes at different tiers, as needed, to maintain the lowest cost while ensuring that data volume usage metrics satisfy requirements.

Example Computing Device for Dynamic Configuration of Storage Volumes

Figure 9:
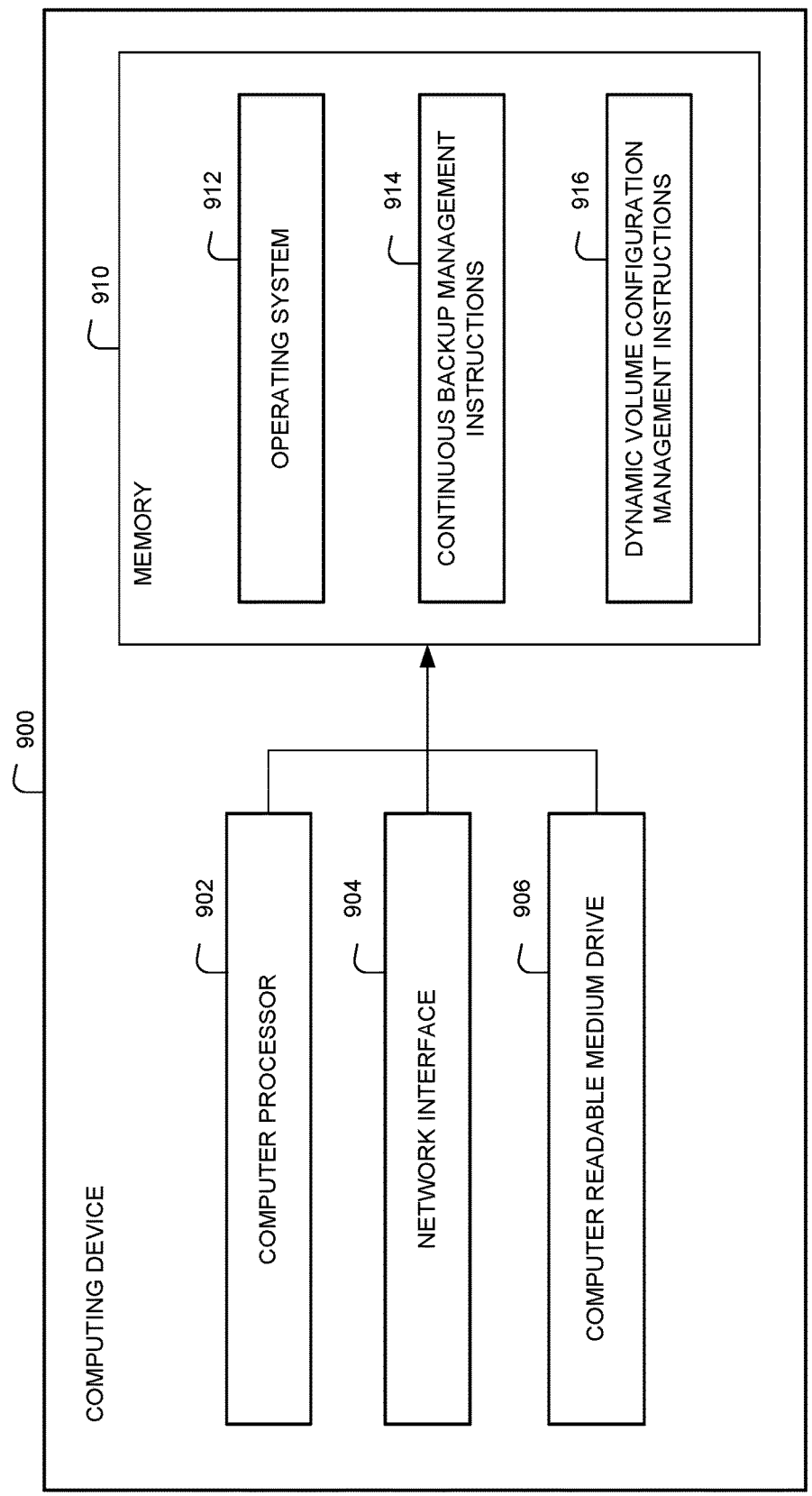
FIG. 9 is a block diagram of an illustrative computing device configured to implement features of dynamic configuration of volume type according to some embodiments.

FIG. 9 illustrates various components of an example computing device 900 configured to implement various functionality of the continuous backup manager 140 and/or dynamic volume configuration manager 130. In some embodiments, a computing device 900 is configured to provide all of the features of both the continuous backup manager 140 and dynamic volume configuration manager 130. In some embodiments, a computing device 900 provides only the features of the continuous backup manager 140 or dynamic volume configuration manager 130. In some embodiments, a computing device 900 is configured to provide only a subset of features of a continuous backup manager 140 or dynamic volume configuration manager 130.

In some embodiments, as shown, the computing device 900 may include: one or more computer processors 902, such as physical central processing units ("CPUs"); one or more network interfaces 904, such as a network interface cards ("NICs"); one or more computer readable medium drives 906, such as a high density disk ("HDDs"), solid state drives ("SSDs"), flash drives, and/or other persistent non-transitory computer-readable media; and one or more computer readable memories 910, such as random access memory ("RAM") and/or other volatile non-transitory computer-readable media.

The computer readable memory 910 may include computer program instructions that one or more computer processors 902 execute in order to implement one or more embodiments. The computer readable memory 910 can store an operating system 912 that provides computer program instructions for use by the computer processor(s) 902 in the general administration and operation of the computing device 900.

In some embodiments, the computer readable memory 910 can further include computer program instructions and other information for implementing aspects of the present disclosure. For example, the computer-readable memory 910 may include continuous backup management instructions 914 for providing the features of the continuous backup manager 140, such as instructions for performing the routine 200. As another example, the computer-readable memory 910 may include dynamic volume configuration management instructions 916 for providing the features of the dynamic volume configuration manager 130, such as instructions for performing the routine 600.

When processes 200 or 600 are initiated, a corresponding set of executable program instructions stored on a computer readable medium drive 906 may be loaded into computer readable memory 910 and executed by one or more computer processors 902. In some embodiments, the processes 200 and 600—or portions thereof—may be implemented on multiple computing devices and/or multiple processors, serially or in parallel.

Terminology and Additional Considerations

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system for dynamic configuration of backup volumes, the system comprising:
   a first block storage volume type associated with a first throughput parameter;
   a second block storage volume type associated with a second throughput parameter, wherein the second throughput parameter represents a higher available throughput than the first throughput parameter; and
   a continuous backup manager comprising one or more computing devices, wherein the continuous backup manager is configured to:
      obtain recovery point objective data representing a maximum amount of data permitted to be lost in a failure event associated with a production data volume;
      perform, for each of a first plurality of production data write operations to the production data volume, a corresponding backup data write operation to a backup volume configured as the first block storage volume type;
      obtain timing data associated with a subsequent production data write operation occurring after the first plurality of production data write operations;
      determine, based on the timing data, that a lag threshold associated with the recovery point objective data has been exceeded, wherein the lag threshold relates to an elapsed period of time between a first time represented by the timing data and a second time represented by a system clock;
      determine, based on the lag threshold being exceeded, to use the second block storage volume type for the backup volume of the production data volume; and
      perform, for each of a second plurality of production data write operations to the production data volume, a corresponding backup data write operation to the backup volume configured as the second block storage volume type.

2. The system of claim 1, wherein the continuous backup manager is further configured to determine the lag threshold as portion of a maximum time period represented by the recovery point objective data.

3. The system of claim 1, wherein the continuous backup manager is further configured to copy data associated with the production data volume from a first block storage volume to a second block storage volume,
   wherein the first block storage volume corresponds to the backup volume configured as the first block storage volume type,
   wherein the second block storage volume corresponds to the backup volume configured as the second block storage volume type, and
   wherein at least a portion of the data associated with the production data volume is copied from the first block storage volume to the second block storage volume in parallel with performance of a backup data write operation to the second block storage volume.

4. The system of claim 3, wherein the continuous backup manager is further configured to:

determine, based on a backup tier reduction criterion and subsequent to copying data associated with the production data volume from the first block storage volume to the second block storage volume, to use the first block storage volume to back up the production data volume;

perform, for each of a third plurality of production data write operations to the production data volume, a corresponding backup data write operation to the first block storage volume; and copy the data associated with the production data volume from the second block storage volume to the first block storage volume.

5. A computer-implemented method comprising:
under control of a computing system comprising one or more computing devices configured to execute specific instructions,
performing a first backup input/output ("I/O") operation to a backup data volume configured as a first volume type, wherein the first backup I/O operation is based on a first source I/O operation to a source data volume, and wherein the first volume type is associated with a first performance parameter;
obtaining timing data associated with a second source I/O operation to the source data volume;
determining, based on the timing data failing to satisfy a criterion, to use a second volume type associated with a second performance parameter indicating a different degree of performance than the first performance parameter; and
performing a second backup I/O operation to the backup data volume configured as the second volume type, wherein the second backup I/O operation is based on the second source I/O operation to the source data volume.

6. The computer-implemented method of claim 5, further comprising storing, in a cache, data regarding the first source I/O operation, wherein the cache is associated with a third performance parameter indicating a higher degree of performance than the first performance parameter, and wherein performing the first backup I/O operation is based on the data regarding the first source I/O operation stored in the cache.

7. The computer-implemented method of claim 5, further comprising obtaining recovery point objective data representing a maximum amount of data permitted to be lost in a failure event associated with the source data volume.

8. The computer-implemented method of claim 7, wherein determining that the timing data fails to satisfy the criterion comprises determining that a lag threshold associated with the recovery point objective data has been exceeded, wherein the lag threshold relates to an elapsed period of time between a first time represented by the timing data and a second time represented by a system clock.

9. The computer-implemented method of claim 8, further comprising determining the lag threshold as portion of a maximum time period represented by the recovery point objective data.

10. The computer-implemented method of claim 5, further comprising copying data associated with the first backup I/O operation from a first storage volume to a second storage volume, wherein the first storage volume corresponds to the backup data volume configured as the first volume type, wherein the second storage volume corresponds to the backup data volume configured as the second volume type, and wherein data associated with the first backup I/O operation is copied from the first storage volume to the second storage volume in parallel with performing the second backup I/O operation to the second storage volume.

11. The computer-implemented method of claim 5, further comprising:
determining that use of the backup data volume configured as the second volume type satisfies a backup tier reduction criterion; and
determining, based on satisfaction of the backup tier reduction criterion, to use a third volume type associated with a third performance parameter indicating an intermediate degree of performance between the first performance parameter and the second performance parameter.

12. The computer-implemented method of claim 5, further comprising:
determining that use of the backup data volume configured as the second volume type satisfies a backup tier reduction criterion; and
determining, based on satisfaction of the backup tier reduction criterion, to use the backup data volume configured as the first volume type.

13. A system comprising:
computer-readable memory storing executable instructions; and
one or more processors configured by the executable instructions to at least:
perform a first backup input/output ("I/O") operation to a backup data volume with a first backup data volume configuration, wherein the first backup I/O operation is performed based on a first source I/O operation to a source data volume, and wherein the first backup data volume configuration is associated with a first performance parameter;
obtain timing data associated with a second source I/O operation to the source data volume;
determine, based on the timing data failing to satisfy a criterion, to use a second backup data volume configuration associated with a second performance parameter indicating a different degree of performance than the first performance parameter; and
perform a second backup I/O operation to the backup data volume with the second backup data volume configuration, wherein the second backup I/O operation is performed based on the second source I/O operation to the source data volume.

14. The system of claim 13, wherein the one or more processors are configured by further executable instructions to store, in a cache, data regarding the first source I/O operation, wherein the cache is associated with a third performance parameter indicating a higher degree of performance than the first performance parameter, and wherein the first backup I/O operation is performed based on the data regarding the first source I/O operation stored in the cache.

15. The system of claim 13, wherein the one or more processors are configured by further executable instructions to obtain recovery point objective data representing a maximum amount of data permitted to be lost in a failure event associated with the source data volume.

16. The system of claim 15, wherein the one or more processors are configured by further executable instructions to determine that a lag threshold associated with the recovery point objective data has been exceeded, wherein the lag threshold relates to an elapsed period of time between a first time represented by the timing data and a second time represented by a system clock.

17. The system of claim 16, wherein the one or more processors are configured by further executable instructions to determine the lag threshold as portion of a maximum time period represented by the recovery point objective data.

18. The system of claim 13, wherein the data associated with the first backup I/O operation is copied from a first backup data volume to a second backup data volume.

19. The system of claim 13, wherein the one or more processors are configured by further executable instructions to:
   determine that use of the backup data volume with the second backup data volume configuration satisfies a backup tier reduction criterion; and
   determine, based on satisfaction of the backup tier reduction criterion, to use a third backup data volume configuration associated with a third performance parameter indicating an intermediate degree of performance between the first performance parameter and the second performance parameter.

20. The system of claim 13, wherein the one or more processors are configured by further executable instructions to:
   determine that use of the backup data volume with the second backup data volume configuration satisfies a backup tier reduction criterion; and
   determine, based on satisfaction of the backup tier reduction criterion, to use the backup data volume with the first backup data volume configuration.

\* \* \* \* \*